(12) United States Patent
Kim

(10) Patent No.: US 6,217,925 B1
(45) Date of Patent: Apr. 17, 2001

(54) NITRITE FORMATION IN BEEF MIXED VEGETABLE JUICE: ISOLATION OF NITRITE-RESISTANT BACTERIA WHICH HAVE NITRATE REDUCTASE ACTIVITY

(76) Inventor: Cheryl K. Kim, 4683 Ravine Dr., Bloomfield Hills, MI (US) 48301

( * ) Notice: Subject to any disclaimer, the term of this patent is extended or adjusted under 35 U.S.C. 154(b) by 0 days.

(21) Appl. No.: 09/258,440

(22) Filed: Feb. 26, 1999

Related U.S. Application Data

(60) Provisional application No. 60/076,313, filed on Feb. 27, 1998.

(51) Int. Cl.$^7$ ............................... A23C 4/22; A23C 4/24

(52) U.S. Cl. ........................ 426/335; 426/52; 426/56; 426/321; 426/335; 426/532; 426/615; 426/654; 426/655

(58) Field of Search ................... 426/335, 52, 56, 426/615, 655, 654, 532, 321

(56) References Cited

U.S. PATENT DOCUMENTS 3,374,099 * 3/1968 Bell et al. ........................ 426/321

FOREIGN PATENT DOCUMENTS

849358A2 * 6/1998 (EP) .

OTHER PUBLICATIONS

Committee on Nitrite and Alternative Curing Agents in Food, National Academy of Sciences (1981) Chapter 3. The Utility of Nitrate and Nitrite Added to Foods in The Health Effects of Nitrate, Nitrite, and N–nitroso Compounds, Washington, DC National Academy Press.

Committee on Nitrite and Alternative Curing Agents in Food, National Academy of Sciences (1981) Chapter 5, Nitrate, Nitrite, and Nitrogen Oxides: Environmental Distribution and Exposure of Humans in The Health Effects of Nitrate, Nitrite, and N–Nitroso Compounds, Washington, DC National Academy Press.

White, Jr., J.W. (1975) Relative Significance of Dietary Sources of Nitrate and Nitrite. J. Agric. Food Chem. 23, 886–891.

Schmidt, H. H. H. (1995) Determination of Nitric Oxide via Measurement of Nitrite and Nitrate in Culture Media. Biochemica 2,77.

Vodovotz, Y. (1996) Modified Microassay for Serum Nitrite and Nitrate. BioTechniqaues 20, 390–394.

Kubo, Y., Ogura, N. and Nakagawa, H. (1988) Limit Proteolysis of the Nitrate Reductase From Spinach Leaves. J. Biol. Chem. 263, 19684–19689.

Hyde, G. and Campbell, W., (1990) High–level expression on Escherichia coli of the Catalytically Active Flavin Domain of Corn Leaf NADH:nitrate reductase and its comparison to human NADH:cytochrome b5 Reductase. Biochem. Biophys. Res. Commun. 168, 1285–1291.

Carlson, C.A., Ferguson, L.P. and Ingraham, J.L. (1982) Properties of Dissimilatory Nitrate Reductase Purified from the Denitrifier Pseudomonas Aeruginosa. J. Bacteriol. 151, 162–171.

(List continued on next page.)

Primary Examiner—Helen Pratt
(74) Attorney, Agent, or Firm—Kohn & Associates

(57) ABSTRACT

There is provided a method for retarding bacterial growth in foods by adding plant extracts. Also provided is a bacterial growth inhibitor for foods containing a plant extract. A method for isolating nitrate-resistant bacteria with nitrate reductase activity by growing nitrate-resistant bacterial and nitrate rich media is also provided. Also provided is a method of measurement by utilizing nitrate-resistant bacteria with high nitrate reductase activity.

5 Claims, 4 Drawing Sheets

OTHER PUBLICATIONS

Smith, G.B. and Tiedje, J.M. (1992) Isolation and Characterization of a Nitrite Reductase Gene and Its Use as a Probe for Denitrifying Bacteria. Appl. Environ. Microbiol. 58, 376–384.

Bursakov, S.A., Carneiro, C., Almendra, M.J., Duarte, R.O., Caldeira, J., Moura, I. and Moura, J.J. G. (1997) Enzymatic Properties and Effect of Ionic Strength on Periplasmic Nitrate Reductase (NAP) From Desulfovibrio Desulfuricans ATCC 27774. Biochem. Biophys. Res. Commun. 239, 816–822.

Siddiqui, R.A., Warnecke–Eberz, U. Hengsberger, A., Schneider, B., Kostka, S. and Friedrich, B. (1993) Structure and Function of a Periplasmic Nitrate Reductase in Alcaligenes Eutrophus H16. J. Bacteriol. 175, 5867–5876.

Carter, J.P., Richardson, D.J. and Spiro, S. (1995) Isolation and Characterisation of a Strain o fPseudomonas Putida That Can Express a Periplasmic Nitrate Reductase. Arch. Microbiol. 163, 159–166.

Enoch, H.G., and Lester, R.L., The Purification and Properties of Formate Dehydrogenase and Nitrate Reductase from *Escherichia Coli*. J. Biol. Chem. 250, 6693, 1975.

Fox, B.A. and Cameron, A.G. Food Spoilage and Preservation. In Food Science, Nutrition and Health (Fifth Edition). Hodder and Stoughton Limited, London, England 1989 329–358.

Francis, F.J. and Clydesdale, F.M. The Chemistry of Meat Color. In Food colorimetry: Theory and Applications. The Avi Publishing Company, Inc., Westport, Connecticut, 1975 279–291.

Graham, H.D. Nitrosamines. Th eSafety of Foods. The Avi Publishing Company, INc., Westport Connecticut 1980. 319–349.

Jukes, T.H. Nitrates and Nitrites as Components of the Normal Environment. Proc. Meat Ind. Res. Conf. Chicago. 1976 (not available—will supply at a later date).

Schmidt, H.H.H.W., Warner, T.D., Nkane, M., Forstermann, U., Murad, F. Regulaton and subcellular location of nitrogen oxide synthases in RAW 264.7 Macrophages. Mol Pharmacol 1992. 41,615.

Van't Reit, J., and Planta, R.J. Purification, Structure and Properties of the Respiratory Nitrate Reductase of Klebsiella Aerogenes. Biochem. Biophys., Acta. 1975, 379,81.

Ausubel et al., Current Protocols in Molecular Biology, John Wiley and Sons, Baltimore, Maryland (1989).

\* cited by examiner

NITRITE FORMATION IN BEEF MIXED VEGETABLE JUICE: ISOLATION OF NITRITE-RESISTANT BACTERIA WHICH HAVE NITRATE REDUCTASE ACTIVITY

CROSSREFERENCE TO RELATED APPLICATIONS

This application is based on a Provisional Patent Application, Ser. No. 60/076,313 filed Feb. 27, 1998.

BACKGROUND OF THE INVENTION

1. Field of the Invention

The present invention relates to a general method for isolation and growth of nitrite-resistant bacteria with a high level of inducible nitrate reductase activity. In particular, the present invention relates to a method of isolation and growth of bacteria with a high level of inducible nitrate reductase activity using Chinese cabbage and celery extracts as a source of the bacteria and media.

The present invention also relates to a general method of inhibiting bacterial growth in foods by adding nitrate-rich vegetable extracts. More specifically, the present invention demonstrates an anti-bacterial effect of Chinese cabbage and celery extracts on beef during storage.

2. Description of Related Art

Sodium nitrate and nitrite are added to meat as preservatives to ward off bacteria. These compounds are also responsible for a bright-red color of cured meat (Committee on nitrite and alternative curing agents in food, national Academy of Sciences, Chapter 3, 1981). Vegetables such as celery, spinach, beets, turnip greens, radishes and lettuce have a high nitrate content (Committee on nitrite and alternative curing agents in food, national Academy of Sciences, Chapter 5, 1981). As a result, nitrate consumed by U.S. residents is primarily through vegetables. However, the main source of nitrite in the U.S. is cured meats (Committee on nitrite and alternative curing agents in food, national Academy of Sciences, Chapter 5, 1981; White, 1975).

In mammalian cells, nitric oxide synthase catalyzes formation of nitric oxide from L-arginine. Nitric oxide plays a significant role in signal transduction and cell to cell communication. Nitric oxide release can be assayed by measuring its stable degradation products, nitrite and nitrate (Schmidt, 1995).

The most commonly used method for analysis of nitrite is a colorimetric method using the Griess reaction (Committee on nitrite and alternative curing agents in food, national Academy of Sciences, Chapter 5, 1981; Schmidt, 1995). Nitrate is determined by measurement of nitrite by the Griess reaction after reduction of nitrate to nitrite (Committee on nitrite and alternative curing agents in food, national Academy of Sciences, Chapter 5, 1981; Schmidt, 1995). Nitrate is reduced to nitrite by passing the reaction mixture through a column packed with cadmium shavings or by adding granulated cadmium in the mixture (Committee on nitrite and alternative curing agents in food, national Academy of Sciences, Chapter 5, 1981; Vodovotz, 1996).

Recently, nitrate was enzymatically reduced to nitrite by incubation with nitrate reductase. Nitrate reductase has been studied in bacteria, fungus and plants. Thus far three different kinds of nitrate reductases have been found. Assimilatory nitrate reductase converts nitrate to ammonia, vianitrite, which is assimilated to nitrogen metabolism.

Ammonia, the end product of the pathway inhibits nitrate reductase activity and oxygen does not have any effect on the nitrate reductase activity (Kubo, et al., 1988; Hyde et al., 1990). A membrane-bound, respiratory (dissimilatory) nitrate reductase converts nitrate to nitrite (Carlson, et al. 1982) and then the formed nitrite is converted to nitric oxide and nitrous oxide by respiratory nitrite reductase (Smith, et al. 1992). This pathway, which produces ATP from ADP using nitrate in anaerobic condition, is insensitive with ammonia.

Recently, the third nitrate reductase, periplasmic nitrate reductase, has been found. Contrary to the other nitrate reductases, the periplasmic nitrate is not encoded on the chromosome, but by the megaplasmid and the gene products with a signal peptide are found in the periplasm (Bursakov, et al. 1997; Siddiqui, et al. 1993; Carter, et al. 1995). This nitrate reductase may be involved in cellular redox balance.

A few commercially available nitrate reductases are nitrate reductase which are obtained from *E. coli* (Worthington Biochemical Co. and Sigma Co, Aspergillus (Boehringer-Mannheim), and corn (The Nitrate Elimination Co.).

The significance of the presence of nitrite and nitrate in meat relates to health concerns. Adding nitrite and nitrate to meat became a health problem because sometimes nitrite reacts with the amines in meat. This reaction forms a chemical, nitrosamines, that is found to cause cancer in laboratory animals (Graham, 1980). To avoid the health problem caused by this nitrosamine formation, some meat products contain BHA and BHT, preservatives of another kind. However, neither of these preservatives are naturally occurring.

It would therefore be useful to develop a method for the isolation and growth of nitrite released in bacteria with high nitrate reductase activity. Additionally, it would be useful to develop a method for the retardation of bacterial growth in foods using plant extracts.

SUMMARY OF THE INVENTION

According to the present invention, there is provided a method for retarding bacterial growth in foods by adding plant extracts. Also provided is a bacterial growth inhibitor for foods containing a plant extract. A method for isolating nitrate-resistant bacteria with nitrate reductase activity by growing nitrate-resistant bacterial and nitrate rich media is also provided. Also provided is a method of measurement utilizing nitrate-resistant bacteria with high nitrate reductase activity.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
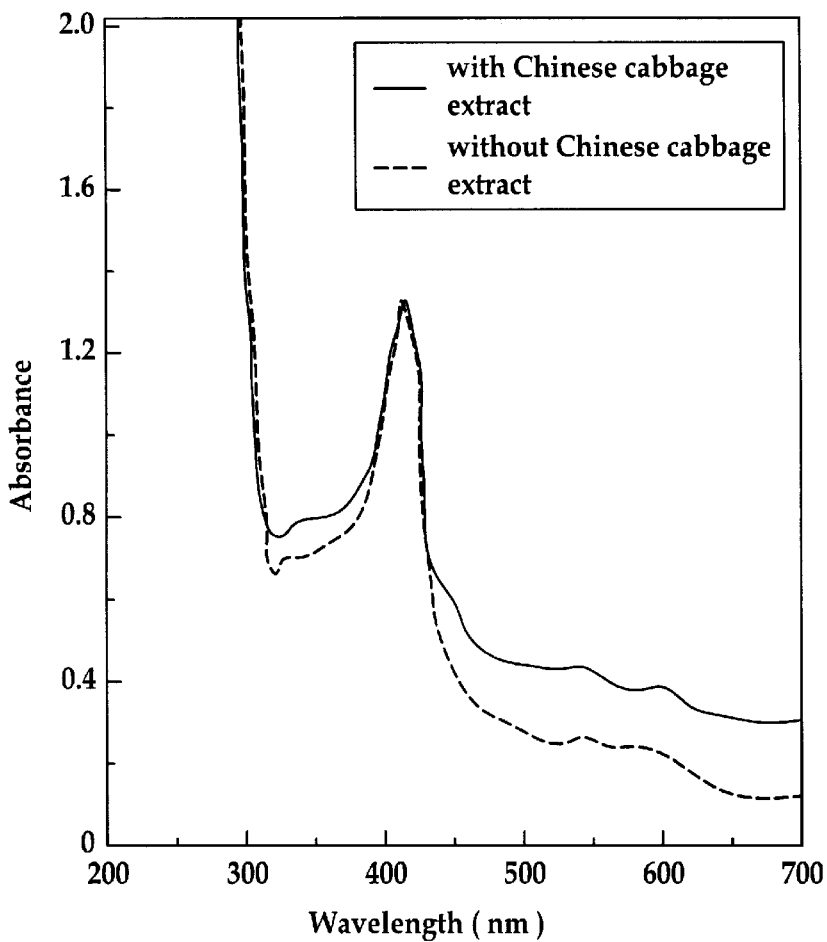
FIG. 1 illustrates comparison of visible absorption spectra of extracts obtained from beef patties cooked with and without adding Chinese cabbage extract.

Generally, the present invention provides a method for the isolation and growth of nitrite-resistant bacteria with a high level of inducible nitrate reductase activity. The method includes the steps of growing nitrite-resistant bacteria in nitrate-rich media. In the preferred embodiment, Chinese cabbage and celery extracts were used as media to grow nitrite-resistant bacteria. However, the media can be any other nitrate-rich vegetable or plant extracts, or synthetic media with high nitrate and cofactors for suitable growth of nitrite-resistant bacteria with a high level of inducible nitrate reductase activity.

In a preferred embodiment, the nitrite-resistant bacteria were obtained from Chinese cabbage or celery extracts. The source of bacteria can be other vegetable or plant extracts, or another source which can harbor nitrate-resistant bacteria, e.g. dirt. In the preferred embodiment, nitrite-resistant bacteria which have a high level of inducible nitrate reductase activity were selected by growing bacteria in filter-sterilized Chinese cabbage extract followed by testing for nitrite formation. Almost all of the nitrite-resistant bacteria were white colony forming bacteria which had high nitrate reductase activity. Thus, the selection procedure can be eliminated. The white colony forming bacteria have unique morphology when they were grown in agar plates. Accordingly, the bacteria can be selected by morphology. The media can be pasteurized or heat-sterilized.

The nitrate-resistant bacteria can be selected from vegetable extracts without incubation, by their morphology or other unique characteristics. However, nitrate reductase activity of the bacteria has to be induced by incubation of the bacteria with nitrate-rich vegetable extracts or suitable nitrate-rich media. The bacteria harbor on the surface of the vegetables and do not show nitrate reductase activity, however when they are mixed with the vegetable extracts, the nitrate reductase activity of the bacteria is induced.

In the preferred embodiment, nitrate reductase activity of the nitrite-resistant bacteria was induced by incubation of the bacteria with Chinese cabbage or celery extracts. Media to induce nitrate reductase activity of the bacteria can be other nitrate-rich vegetable or plant extracts, or synthetic media with high nitrate and cofactors for suitable growth of nitrite-resistant bacteria.

In another embodiment of the present invention, the isolated nitrite-resistant bacteria with high nitrate reductase activity can be utilized to determine nitrate levels and nitric oxide synthase activity. Further, the nitrite-resistant bacteria can be utilized to obtain purified nitrate reductase. This purified nitrate reductase is useful as a measuring device for nitrate levels, determination of nitric oxide synthase activity, the conversion of nitrate to nitrite as part of the elimination procedure and for measuring antibody production. The tests used to measure the above items can be determined by one skilled in the art.

The present invention further relates to a general method for the retardation of bacterial growth in foods by the addition of nitrate-rich vegetable extracts. The method includes the steps of mixing foods with nitrite-rich vegetable extracts prior to storage. In the preferred embodiment, Chinese cabbage or celery extracts were the nitrite-rich vegetable extracts utilized. The vegetable extracts can be other nitrate-rich vegetable or plant extracts. The extracts can be pasteurized or filter- or heat-sterilized.

In the preferred embodiment, Chinese cabbage or celery extracts were added to beef The extracts can also be added to other meats or edible foods. The food can then be stored at room temperature, or refrigerated or frozen. This allows the food to be packaged or processed with heat.

The above discussion provides a factual basis for the use of vegetable extracts for both the isolation and growth of nitrite-resistant bacteria and the use of vegetable extracts for the retardation of bacterial growth in foods. The methods used with and the utility of the present invention can be shown by the following non-limiting examples and accompanying figures.

EXAMPLES

General Methods:

General methods in molecular biology: Standard molecular biology techniques known in the art and not specifically described were generally followed as in Sambrook et al., *Molecular Cloning: A Laboratory Manual,* Cold Springs Harbor Laboratory, New York (1989, 1992), and in Ausubel et al., *Current Protocols in Molecular Biology,* John Wiley and Sons, Baltimore, Md. (1989).

Example 1

Methods and Materials:

Reagents. Ready-to-use agar plates (trypticase soy agar with 5% sheep blood) were obtained from Baxter Diagnostics Inc. (McGaw Park, Ill.). Color reagent, which contains sulfanilamide and N-(1-naphthyl)ethylenediamine, was obtained from The Nitrate Elimination Co. (Lake Linden, Mich.). Other reagents were purchased from Sigma Chemical Co. (St. Louis, Mo.).

Production of Beef Patties. Beef was divided into equal portions of 135 grams. Fifty ml of water, Chinese cabbage or celery extracts were added to beef, kept at 4° C. for three days and cooked.

Measurement of Absorption Spectra of Cooked Beef Extracts. A portion (three g) of cooked beef patties obtained with or without vegetable extract was crushed, and ten ml water and 0.2 ml 5N NaOH were added and kept at room temperature for an hour to dissolve proteins. The dissolved beef patties were spun for 30 seconds using a table top centrifuge and supernatants were taken. Absorption spectra of the supernatants were obtained in the range of 200 to 700 nm using a Shimadzu UV-Vis spectrophotometer (UV 1601).

Sample Dilution for Bacterial Culture on Agar Plates. For experiments to isolate nitrite-resistant bacteria, three g of beef, mixed with sterilized water or Chinese cabbage juice, were taken and mixed in 350 ml of water in a jar. A sample (0.5 ml) was taken from the jar and put into a 50 ml sterilized conical tube filled with 49.5 ml of water (35,000-fold dilution).

A sample (0.5 ml) was taken from the tube and put into the second 50 ml sterilized conical tube filled with 49.5 ml of water (3.5 million-fold dilution). A sample (0.5 ml) was taken from the first test tube and the second test tube, and placed in the ready-to-use agar plates.

The number of bacterial colonies on each plate was counted after incubation at room temperature for three days. The number of bacteria in three grams of beef sample was calculated by multiplying the number of bacteria on the plate with the dilution factor ×2 (0.5 ml of sample was put in the plate).

Bacterial Culture on Agar Plates. Aliquots of diluted samples were taken and placed on ready-to-use agar plates (trypticase soy agar with 5% sheep blood) (Baxter Diagnostics Inc., McGaw Park, Ill.). When the solution was absorbed by the agar, the plates were turned upside-down and kept at room temperature for three days. The number of bacterial colonies on each plate was compared.

A Standard Curve for Nitrite Levels. Nitrite levels were determined using the Griess reaction as previously described by Schmidt, 1995. Various concentrations (0 to 20 $\mu$g/ml) of potassium nitrite solutions were made. In a microtube, 100

μl of nitrite solution, 100 μl of 0.5 M phosphate buffer, pH 7.6, and 100 μl (8 mg/ml) of color reagent (The Nitrate Elimination Co., Lake Linden, Mich.) were added. In each tube, 700 μl of water was added and absorption spectra of the nitrite solutions were obtained using a spectrophotometer (Shimadzu Co.).

Optical density of each nitrite solution was measured at 540 nm, and a standard curve to measure nitrite levels was obtained.

Measurement of Nitrite Levels in Beef Mixed with Chinese Cabbage. Beef was divided into three portions of equal size for each group. Each portion was mixed with either water or Chinese cabbage juice and stored at 4° C. for nine days. Beef extract (100 μl), 100 μl of 0.5 M phosphate buffer, pH 7.6, 100 μl of color reagent, and 700 μl of water were mixed and the absorption spectra of the mixture were obtained. For the sample without the color reagent, 100 μl of water was added to the mixture in place of the color reagent.

Measurement of nitrate/nitrite levels in vegetable and fruit juices. Nitrate in juices is converted to nitrite by addition of nitrate reductase, and the formed nitrite reacts with a color reagent to produce pink azo dyes. Vegetable and fruit juices were spun in microtubes for three minutes using a microfuge. The supernatant (100 μl) was taken and added to a microtube.

Nitrate reductase purified from corn (The Nitrate Elimination Co.) was dissolved in 0.5 M phosphate buffer, pH 7.6, and 0.025 unit (100 μl) was added to the vegetable or fruit juice.

The mixture was incubated for 15 minutes at room temperature and 100 μl of color reagent was added. For the measurement of absorption spectra, 700 μl of water was added to each tube. Optical density at 540 nm of each sample was taken and, using a standard curve for nitrite, concentration of nitrite in the tube was obtained. The concentration of nitrate/nitrite in a juice was obtained by multiplying the value with a dilution factor of ten. Nitrite levels in extracts were obtained by addition of 100 μl of 0.5 M phosphate buffer, 100 μl of color reagent, and 700 μl of water to 100 μl of extracts.

Measurement of Time-Dependent Nitrite Formation in Nitrate-Rich Vegetable Juices. Chinese cabbage and celery were washed and wiped with clean paper towel. Chinese cabbage and celery extracts were obtained. Aliquots of extracts (200 μl) were taken for each time point up to 30 hours after extraction of juices. Three samples were taken for each time point. Color reagent (100 μl) was added to each tube at the designated time point and 700 μl of water was added. Optical density at 540 nm of each sample was taken. Mean and standard deviation of each time point were obtained using StatView 512+TM (BrainPower, Inc., Calabasas, Calif.).

Filter-Sterilization of Chinese Cabbage Juice. Chinese cabbage juice was filtered using Acrodisc LC PVDF disposable filter (0.2 μm, Gelman Co.) and stored in sterilized conical tubes or microtubes.

Results

Chinese cabbage and celery extracts were added to ground beef and stored at 4° C. for three days before cooking. Beef patties mixed with the vegetable extracts, not those with water, showed red color.

The red-colored substance of the cooked beef patties was extracted with an alkaline solution and the visible absorption spectra of extracts were compared (FIG. 1). Beef patty extracts stored with vegetable extracts showed exactly the same height of hemoglobin or myoglobin peak at 410 nm as those without addition of the vegetable extract. However, the beef extracts with Chinese cabbage extract which was red colored showed higher absorbance at 450 to 700 nm as compared with that of beef patties cooked without Chinese cabbage juice which showed brown color. (Red color absorbs 450 to 600 nm).

Beef patties cooked right after addition of the vegetable extracts did not develop the red color. Formation of red color in the beef patties was dose—(vegetable extract) and time—(days of storage) dependent. The addition of antibiotics to the beef patties stored with the vegetable extracts prevented red color formation of the cooked beef patties. These results suggest that bacteria changed nitrate in vegetable to nitrite which reacted with hemoglobin or myoglobin.

Figure 2:
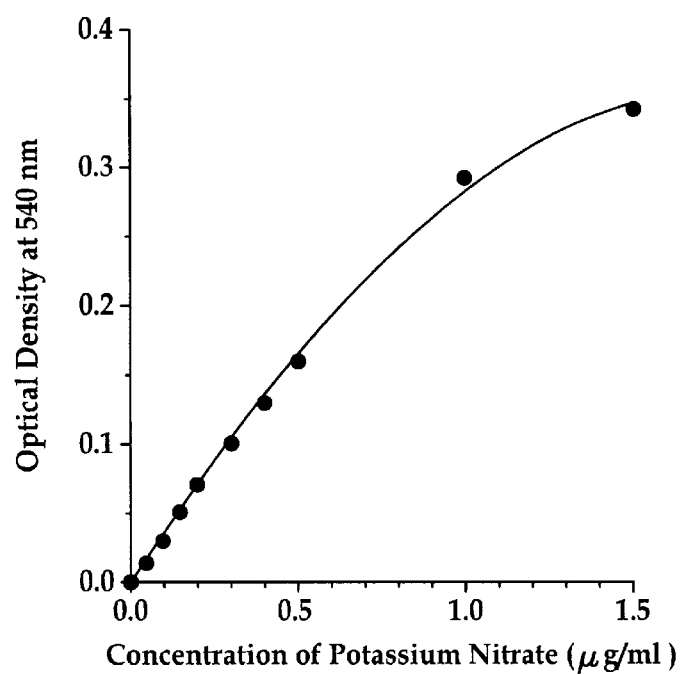
FIG. 2 illustrates a standard curve for measurement of nitrite levels.

Optical density of each nitrite solution (the final concentration is 0 to 1.5 μg/ml) was measured at 540 nm and a standard curve to measure nitrite levels was obtained. Optical densities at 540 nm correlated with the concentrations of nitrite in the solutions (FIG. 2).

Figure 3:
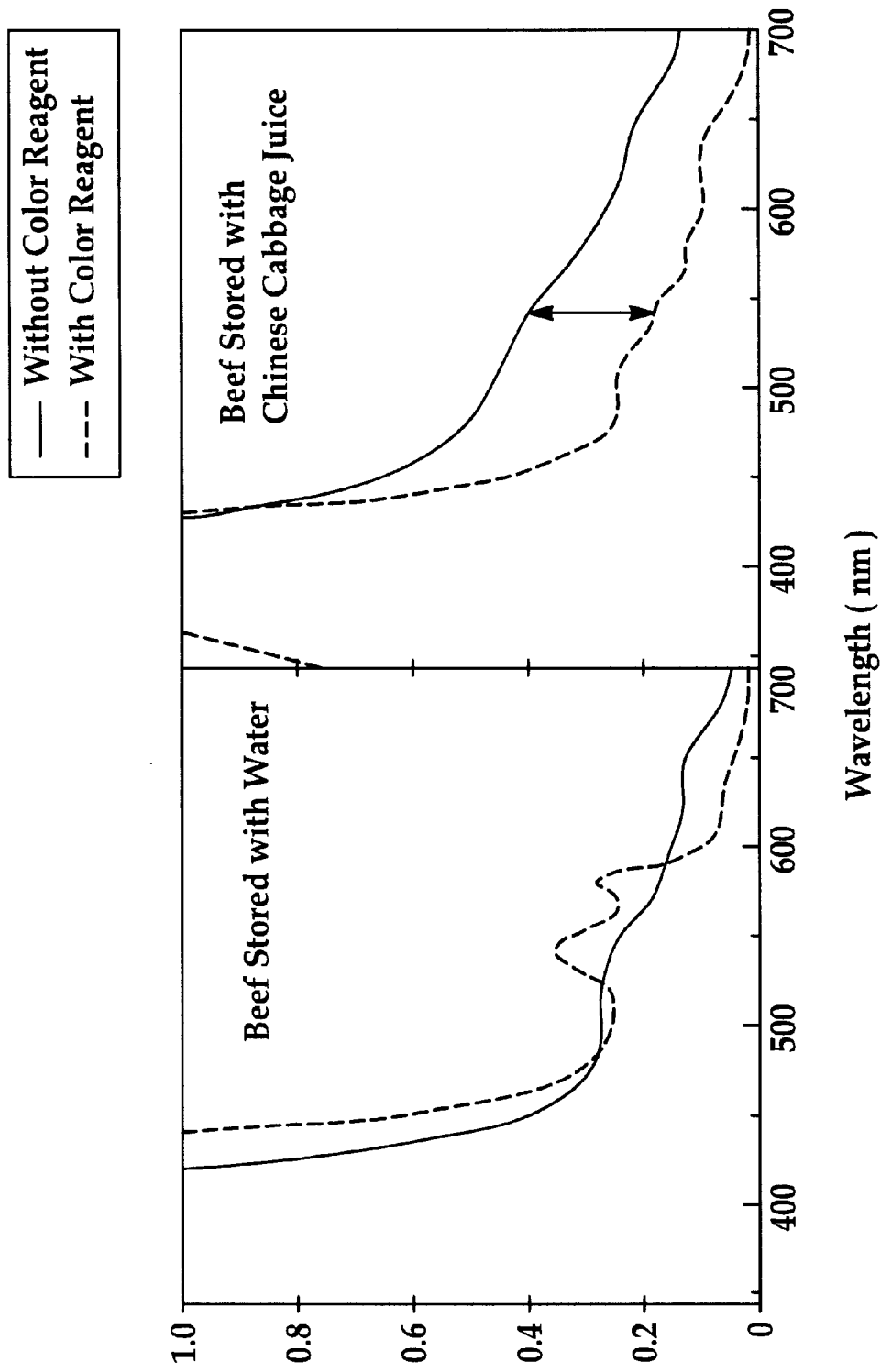
FIG. 3 illustrates nitrite formation in beef extracts stored with Chinese cabbage juice.

The beef was divided into three portions of equal size for each group. Each portion was mixed with either water or Chinese cabbage juice and stored at 4° C. for nine days. The addition of color reagent, which produces a pink azo dye by reaction with nitrite, increased optical density at 540 nm in extracts obtained from beef stored with Chinese cabbage juice (FIG. 3). The difference in optical density at 540 nm between the mixtures with and without addition of color reagent (the beef extracts were stored with Chinese cabbage juice) was 0.12, which correlates with 0.3 μg/ml of nitrite solution in the tube. When the value is multiplied by ten (a dilution factor), establishing a nitrite concentration of the beef extract was 3 μg/ml.

The beef was divided into three portions of equal size for each group. Each portion was mixed with either water or Chinese cabbage juice and stored at 4° C. At zero and six days of storage, beef patties were cooked to analyze red color formation (FIG. 4, Panel A), and 3 g of beef patty was diluted seven million-fold and plated on agar plates (FIG. 4 Panel B).

Figure 4A:
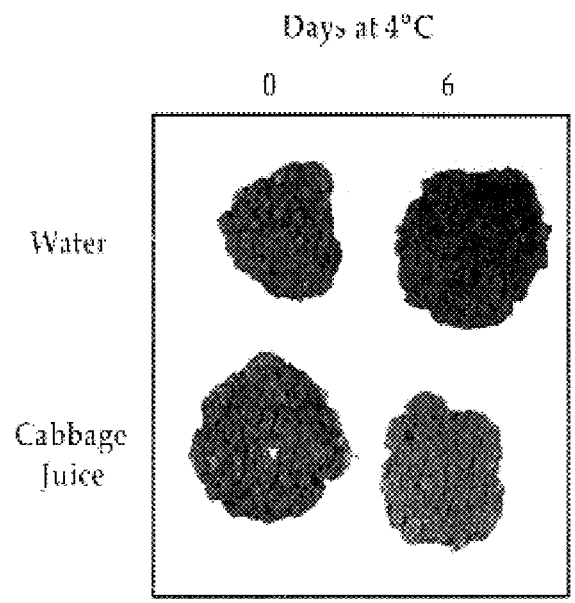
FIG. 4A and FIG. 4B illustrates anti-bacterial activity of Chinese cabbage juice.
Figure 4B:
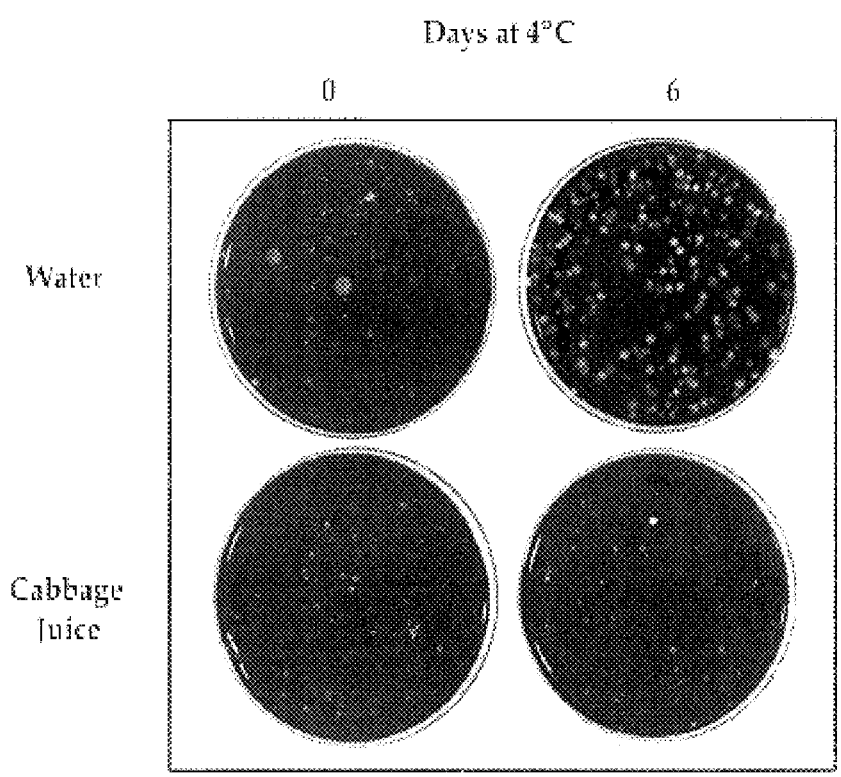

Cooked beef patty mixed with Chinese cabbage juice showed bright red color after six days of storage (FIG. 4, Panel A). This result showed that nitrate in Chinese cabbage juice was changed to nitrite by bacteria in the mixture. The number of bacteria in beef mixed with water dramatically increased after six days of storage, whereas that of beef mixed with Chinese cabbage juice was about the same (FIG. 4, Panel B). This result suggests that bacteria changed nitrate in Chinese cabbage to nitrite, and the formed nitrite inhibited bacterial growth in beef during storage.

Beef mixed with Chinese cabbage juice had ~20 million colonies/3 g after storage at 4° C. for six days (FIG. 4, Panel B). The bacteria, which survived in high levels of nitrite in the mixture (>20 μg), formed white or yellow colonies. The majority of the colonies formed on agar plates were white.

Figure 5:
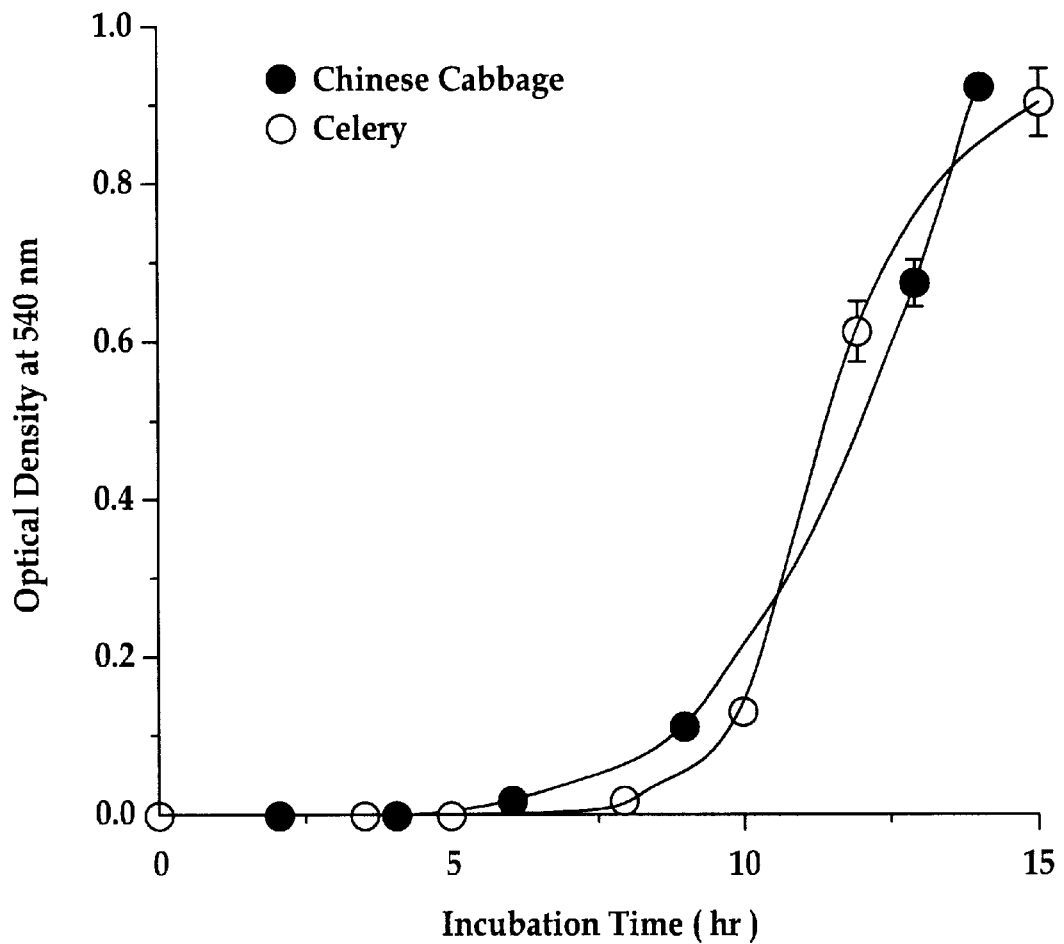
FIG. 5 illustrates time-dependent increase of nitrite levels of nitrate-rich vegetable extracts.

Chinese cabbage or celery extracts (200 μl) were taken for each time point up to 30 hours. Each time point had three samples and samples were kept at room temperature. Color reagent (100 μl) was added to each tube at the designated time point and optical density at 540 nm of each sample was measured after 700 μl of water was added. Time-dependent increases in optical density at 540 nm for Chinese cabbage and celery extracts are shown in FIG. 5. These results showed that nitrite was formed from nitrate in the vegetable extracts by bacteria which were harbored on the surface of the vegetables. The levels of nitrite dramatically increased at about ten hours after extraction of juice. The concentration of nitrite in the vegetable extracts was higher than 20 μg/ml after ~15 hours incubation at room temperature.

Chinese cabbage or celery extract was stored at room temperature for 30 and 24 hours, respectively. Both vegetable extracts showed dark red color after addition of color reagent which measures nitrite levels. Nitrite concentrations of the extracts were higher than 20 µg/ml. The vegetable extracts were diluted seven million-fold and aliquots of the diluted samples were placed on agar plates. About ten colonies of white and yellow were formed on the agar plate after three days of incubation at room temperature. Majority of the colonies formed by the nitrite-resistant bacteria were white colored. The shapes and colors of the bacteria were same as those obtained from beef mixed with Chinese cabbage juice after storage at 4° C. for six days (FIG. 4, Panel B). The white and yellow colonies on the agar plate, which were obtained from Chinese cabbage juice after 30 hours incubation at room temperature, were taken, spread on a fresh agar plate, and incubated at room temperature for three days. Chinese cabbage juice was filter-sterilized using Acrodisc LC PVDF disposable filter (0.2 µm, Gelman Co.), and used as nitrate-rich media to grow bacteria. The white and yellow colonies were taken with a sterilized inoculation loop and put in microtubes containing the filter-sterilized Chinese cabbage juice (200 µl). The filtered Chinese cabbage juice stored at room temperature without inoculation of bacteria was clear after 24 hours of incubation at room temperature, whereas the tubes inoculated with white or yellow bacteria became turbid due to growth of bacteria. When a color reagent (100 µl) for the detection of nitrite was added, the juice inoculated with white colony turned red, whereas those of yellow colony didn't change.

In summary, the addition of Chinese cabbage juice to beef inhibited bacterial growth except for a few nitrite-resistant bacteria. High levels of nitrite were formed in nitrate-rich vegetable extracts during storage. The source of the nitrite-resistant bacteria was those harbored on the surface of vegetables. White colony-forming bacteria, which were nitrite-resistant, were isolated from Chinese cabbage juice and beef mixed with Chinese cabbage juice after storage, and their nitrate reductase activity was confirmed using filter-sterilized extracts of nitrate-rich vegetables. The nitrate reductase activity of the bacteria was induced by incubation of the bacteria with nitrate-rich vegetable extracts.

These results show that filter-sterilized nitrate-rich vegetable extracts are suitable growth media for culture of nitrite-resistant bacteria, and suggests that bacteria which formed white colonies, not those of yellow colonies, have nitrate reductase activity. The invention has been described in an illustrative manner, and it is to be understood that the terminology which has not been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A method for retarding bacterial growth in foods by adding a nitrate rich plant extract, wherein the nitrate level of the plant or vegetable is 3.5 µg/kg or greater, and inducing nitrate reductase activity of bacteria indiginous to the food to convert nitrate to nitrite in order to inhibit bacterial growth.

2. A bacterial growth inhibitor consisting essentially of a nitrate rich plant extract wherein the nitrate level of the plant extract is 3.5 µg/kg or greater, and said extract is capable of inducing nitrate reductase activity of bacteria indiginous to a food thereby coverting nitrate to nitrite in order to inhibit bacterial growth.

3. The bacterial growth inhibitor according to claim 2, wherein said nitrate rich plant extract is a vegetable extract.

4. The bacterial growth inhibitor according to claim 3, wherein said vegetable extract is a celery extract.

5. The bacterial growth inhibitor according to claim 3, wherein said vegetable extract is a Chinese cabbage extract.

* * * * *